United States Patent
Chuang

[11] Patent Number: 5,846,313
[45] Date of Patent: Dec. 8, 1998

[54] METHOD FOR REGULATING COMBUSTION LOSS OF COAL ASH

[76] Inventor: Yu-Liang Chuang, No. 11, Li-Jen Lane, Pen-Kuan Rd., Niao-Sung Hsiang, Kaohsiung Hsien, Taiwan

[21] Appl. No.: 839,817

[22] Filed: Apr. 18, 1997

[51] Int. Cl.[6] .................................................. C04B 18/06
[52] U.S. Cl. .................................. 106/705; 106/DIG. 1; 264/DIG. 49
[58] Field of Search .............................. 106/705, DIG. 1; 264/DIG. 49; 501/155

[56] References Cited

U.S. PATENT DOCUMENTS

| | | | |
|---|---|---|---|
| 4,992,102 | 2/1991 | Barbour | 106/DIG. 1 |
| 5,299,692 | 4/1994 | Nelson et al. | 209/2 |
| 5,375,925 | 12/1994 | Elkin | 366/6 |
| 5,405,441 | 4/1995 | Riddle | 106/DIG. 1 |
| 5,513,755 | 5/1996 | Heavilon et al. | 209/2 |
| 5,534,058 | 7/1996 | Strabala | 106/705 |
| 5,622,556 | 4/1997 | Shulman | 106/705 |

FOREIGN PATENT DOCUMENTS 407004632  6/1993  Japan .

OTHER PUBLICATIONS

"Pavement Construction with High Volume Class C and Class F Fly Ash Concrete" Naik et al.; ACI Mater. J. (1995), 92(2), pp. 200–210.

Primary Examiner—Paul Marcantoni
Attorney, Agent, or Firm—Finnegan, Henderson, Farabow, Garrett & Dunner, L.L.P.

[57] ABSTRACT

A method for regulating the quality, such as the combustion loss values, of coal ashes so as to make the same suitable for use in cements is disclosed. The method includes mixing ashes having high combustion loss values with fly ashes having low combustion loss values so that the high combustion loss ashes can be used in cements. The ashes are preferably burned prior to the mixing step in order to reduce residual carbon and oily substances present in the ashes. Bottom ashes collected at the bottom of furnaces are ground and fired to have a combustion loss value and a particle size close to those of fly ashes.

2 Claims, 3 Drawing Sheets

5,846,313

METHOD FOR REGULATING COMBUSTION LOSS OF COAL ASH

BACKGROUND OF THE INVENTION

1. Field of the Invention

This invention relates to a method for regulating the quality of coal ashes, such as fly ashes, more particularly, to a method of regulating the combustion loss values and the particle sizes of ashes so as to achieve a quality suitable for use in making building materials, such as building blocks, bricks, concrete, etc.

2. Description of the Related Art

Ashes resulting from the combustion of coals in furnaces or boilers, such as, those used in electric power generators, include light weight fly ashes which are collected from the stack gases via electrostatic precipitators and heavier bottom ashes which are collected at the bottoms of furnaces or boilers. Bottom ashes are black and porous and are used in building and repairing roads, filling the ground, etc. Fly ash is fine and is used in cements to modify the performance of the cements and to reduce the cement consumption. However, since the quality of fly ashes obtained from the stack gases vary considerably depending on the sources of coals and the conditions of combustion in furnaces or boilers, the combustion loss values of fly ashes range from 4%–20%, and can even increase up to 30% or 40%. It is difficult to obtain fly ashes of uniform quality, such as uniform combustion loss or uniform particles size, without stringent inspection and classification. The direct use of the fly ashes obtained from the stack gases in cements can render the control of the quality of the cements difficult.

The standards for determining the quality of fly ashes for use in cements are generally based on the combustion loss values and the particle sizes of the fly ashes, and especially, depend on the combustion loss values. High quality fly ashes have low combustion loss values and small particle sizes. According to the standards in most countries, the acceptable combustion loss values are set to be less than 12%. Some consumers require higher or more strict quality fly ashes with a combustion loss lower than 1%.

High quality fly ashes for use in Portland cement have been hitherto obtained by classifying and selecting methods, such as, screening methods which utilize blowing wind or separation methods which employ water for floating or settling particles. Since the above two methods are expensive, they have not been commonly employed by cement manufacturers. Usually, the combustion loss values of fly ashes are detected while they are collected, and the fly ashes as collected are directly transported to cement manufacturing factories without further treatment and classification via air blowing and screening or via floatation or sedimentation. At the factories, cement manufacturers merely take samples for testing the combustion loss values of the fly ashes carried by each transporting truck. If the inspected samples have the combustion loss values falling within the standard range, the fly ash loaded on each truck is entirely used. If the combustion loss values of the tested samples are high, the fly ash loaded on each truck is entirely rejected by cement manufacturers and therefore has to be returned to its supplier for disposal.

SUMMARY OF THE INVENTION

A main object of the invention is to provide a method of regulating the quality or the combustion loss values of coal ashes so that the ashes with high combustion loss values can still be used in cements. Another object of the invention is to provide a method of regulating or reducing the combustion loss values of coal ashes so as to obtain high and uniform quality ashes utilizable in cements.

Accordingly, a method of regulating the quality of coal ashes in the present invention, comprises the steps of:

placing ashes in storage chambers according to the different ranges of combustion loss values so that the ashes having a high combustion loss value are placed in one of the storage chambers and that the ashes having a low combustion loss value are placed in the other one of the storage chambers; and mixing the ashes having a high combustion loss value with the ashes having a low combustion loss value in a predetermined ratio so as to obtain a mixture having a combustion loss value falling within a range of combustion loss value acceptable for use in cements.

The regulating method according to the present invention may further comprise the step of burning the ashes, before storing, so as to burn out residual carbon and oily substances present in the ashes.

The present exemplary preferred embodiments of the invention will be described with reference to the accompanying drawings.

DETAILED DESCRIPTION OF THE PREFERRED EMBODIMENTS

Figure 1:
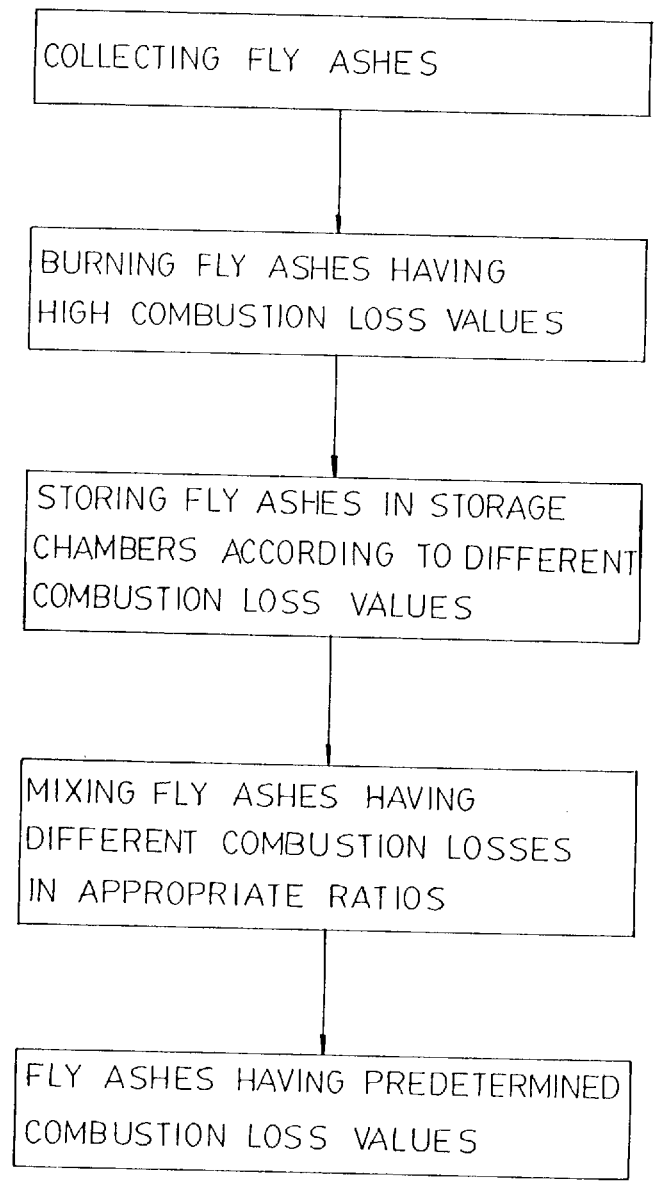
FIG. 1 schematically illustrates a method of regulating fly ashes according to the present invention.
Figure 2:
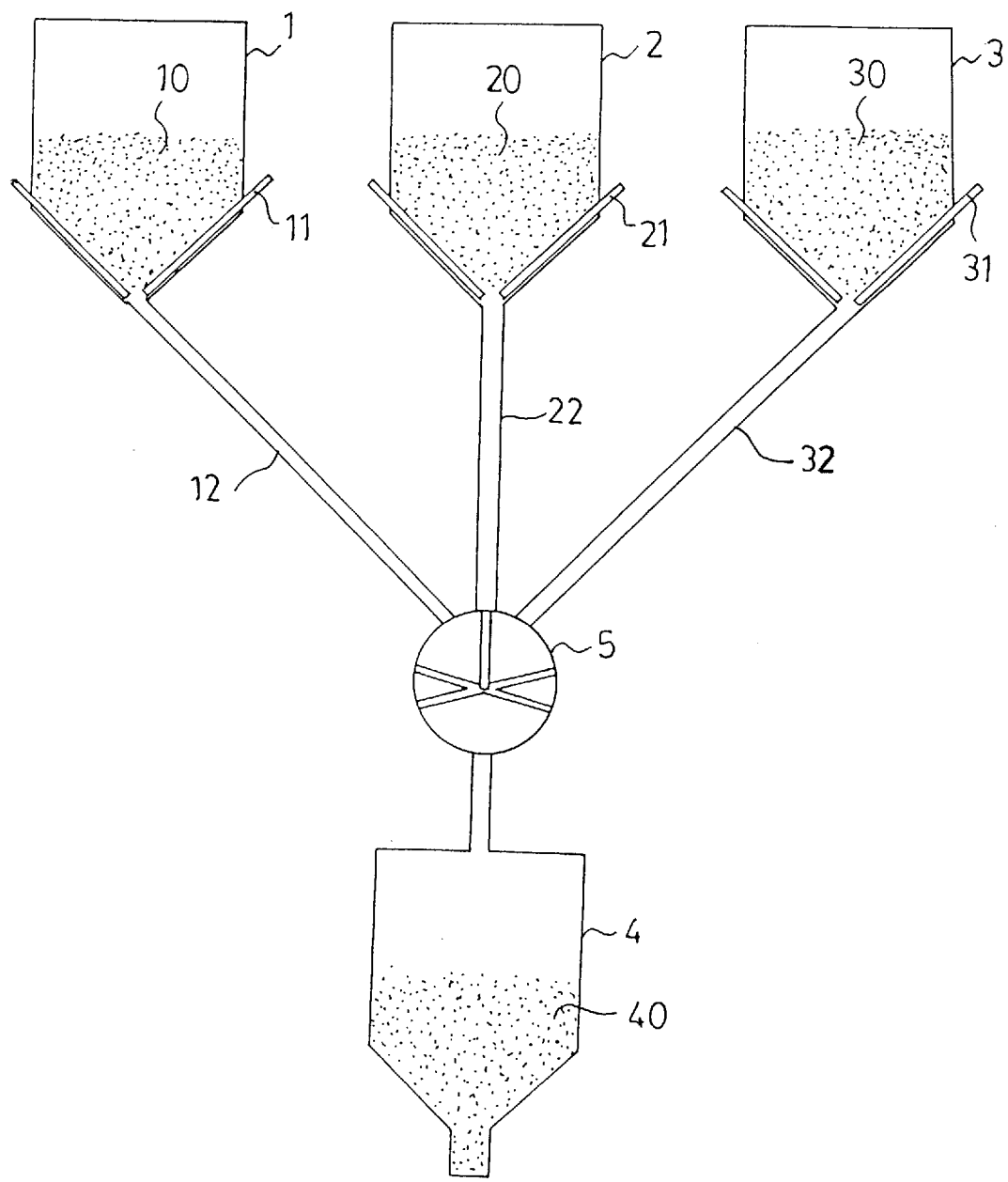
FIG. 2 is a schematic view showing the apparatus used in the present invention.

A preferred embodiment of the method according to the present invention is illustrated in FIGS. 1 and 2. Three different classes of fly ashes 10, 20, 30 which have been classified according to combustion loss values are placed respectively in storage containers 1, 2, and 3. The storage containers 1, 2, and 3 are connected, via pipe lines 12, 22, 32, to a mixer 5 which in turn is connected to a container 4. A batch of fly ash 40 having a predetermined combustion loss is prepared by mixing the fly ashes 10, 20, 30 contained in the storage containers 1, 2 and 3 in a predetermined ratio. Flow regulators 11, 21 and 31 are provided in storage containers 1, 2 and 3 respectively to regulate the flowing rates or the amounts of the fly ashes 10, 20, 30. The mixer 5 is used to mix the fly ashes to obtain a uniform quality throughout the mixed fly ashes.

As described above, the different classes of fly ashes stored in the storage containers 1, 2 and 3 have different combustion loss values, including low combustion loss values, which fall within a range suitable for use in cements, i.e., lower than a combustion loss value of 12%, and high combustion loss values which are not suitable for use in cements. According to the present invention, high combustion loss fly ashes can be used in cements by mixing the same with low combustion loss fly ashes so that the total combustion loss value of the mixture falls within a range suitable for use in blending with cements. Assuming that the combustion loss value of the fly ash 10 contained in the storage container 1 is 16% and the percentage of the amount thereof in mixing is 40% and that the combustion loss value of the fly ash 20 in storage container 2 is 8% and the percentage of the amount thereof in mixing is 60%, when these fly ashes 10 and 20 are mixed together, the combustion loss value of the mixture of the fly ashes 10 and 20 is 16%×0.4+8%×0.6=11.2% so that the combustion loss of the mixture is within an acceptable range of 8%–12%.

In case the combustion loss values of the fly ashes 10, 20, and 30 are 16%, 8% and 30%, and the percentages of the amounts thereof are 20%, 30% and 50%, respectively, after mixing the fly ashes, the resulting combustion loss is 16%×0.2+8%×0.3+10%×0.5=10.8% which is within an acceptable range of 8%–12%. As such, although the combustion loss of the fly ash 10 is 16% and is higher than the acceptable range, the fly ash 10 need not be discarded and can still be used in cements according to the present invention.

The fly ashes 10, 20, and 30 shown in FIG. 2 are obtained after combustion of coals in furnaces or boilers such as those used in fire power electricity generators. Since the combustion loss values of the fly ashes vary considerably according to the sources of coals and the burning situations of the furnaces or boilers, the combustion loss values usually range from 4% to 20% and may increase up to 30% or 40%. In order to reduce the high combustion loss values, the fly ashes having high combustion loss values are preferably burned in high temperature furnaces before being stored in their storage containers so as to reduce the contents of carbon in the fly ashes. The residual oily substances present in the fly ashes can also be burned out by burning the fly ashes.

If it is desired to obtain a high quality fly ash, the fly ashes having combustion loss values falling within the acceptable range (not higher than 12%), may be put into a furnace and burned at at least 400° C. for at least one minute to thereby burn the residual carbon and the residual oily substances. The higher the temperature, the lower will be the time required for burning.

With the burning process, the combustion loss values of fly ashes can be lowered considerably. For example, if the fly ash with a combustion loss higher than 20% is burned at 850° C. for 10 mins, a high quality fly ash having a combustion loss of lower than 1% can be obtained. As compared to the conventional fly ash selecting methods by floatation, sedimentation or screening, the fly ash regulating method according to the present invention is easier and cheaper.

An advantage of the fly ash regulating method of the present invention is that the high temperature heat for burning the fly ash can be obtained by burning the fly ash itself without the need to add fuels, thereby saving the fuel consumption. Another advantage is that the burning of the fly ash can be carried out in furnaces of conventional incinerators or boilers of electricity generators.

Figure 3:
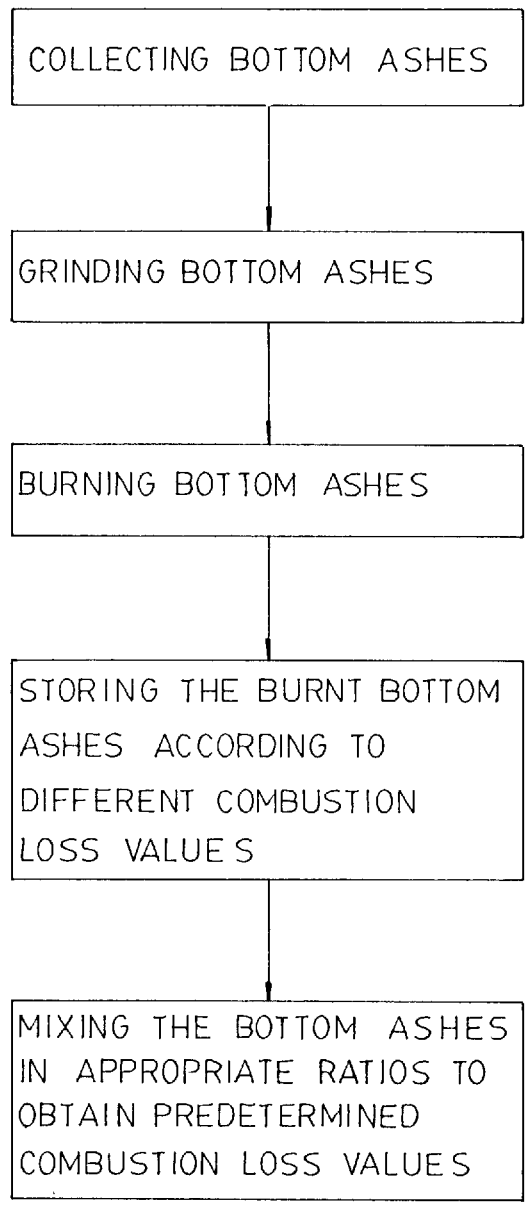
FIG. 3 schematically illustrates a method of regulating bottom ashes to make it suitable for use with fly ashes.

FIG. 3 illustrates a method of regulating the quality of bottom ashes. The bottom ashes are generally similar in composition to fly ashes though having greater densities and particle sizes. Therefore, the combustion loss values of the bottom ashes can be regulated or reduced in the same way as that of the fly ashes. Nevertheless, in order to reduce the particle sizes of the bottom ashes, the regulating method of the bottom ashes further includes the step of grinding the bottom ashes via grinding machines prior to the step of burning thereof. Preferably, the particle sizes of the bottom ashes are reduced, by grinding, to a particle size ranging from 0.00001 to 0.02 cm. The quality of the bottom ashes, after being ground and burned, are close to that of the fly ashes. The so-treated bottom ashes can be used in combination with the fly ashes in cements.

With the invention thus explained, it is apparent that various modifications and variations can be made without departing from the spirit of the present invention. It is therefore intended that the invention be limited to only as recited in the pending claims.

What I claims is:

1. A method for preparing a mixture of coal ashes suitable for use in making a building material, said coal ashes including fly ash and bottom ash, said method comprising the steps of:

(a) grinding the bottom ash to reduce the particle size thereof;

(b) burning the ground bottom ash at a temperature sufficient to burn out residual carbon and oily substances present therein; and (c) mixing the bottom ash burned in the step (b) with the fly ash to form a mixture which has an overall combustion loss value of less than 12%.

2. The method of claim 1, wherein the bottom ash is ground in step (a) to a particle size of from 0.00001 cm to 0.02 cm.

* * * * *